United States Patent [19]

McLain

[11] 4,251,036
[45] Feb. 17, 1981

[54] FILAMENT WINDING APPARATUS FOR MAKING FIBER REINFORCED PLASTIC MEMBERS

[75] Inventor: Philippe H. McLain, Gilbert, S.C.

[73] Assignee: Shakespeare Company, Columbia, S.C.

[21] Appl. No.: 12,821

[22] Filed: Feb. 16, 1979

[51] Int. Cl.$^3$ .................... B65H 81/08; B65H 54/30
[52] U.S. Cl. .................... 242/7.21; 156/350; 156/425; 242/158 B; 242/158.4 R
[58] Field of Search .................... 242/158 B, 7.23, 3, 242/2, 7.21, 7.22, 158 R; 74/37; 156/446, 425, 429, 350

[56] References Cited

U.S. PATENT DOCUMENTS

| | | | |
|---|---|---|---|
| 2,747,649 | 5/1956 | Reed | 242/7.23 |
| 2,911,835 | 11/1959 | Smith | 242/158 B |
| 3,400,594 | 9/1968 | Steyh | 242/158 B |
| 4,087,727 | 5/1978 | McLain | 156/425 |

*Primary Examiner*—Billy S. Taylor
*Attorney, Agent, or Firm*—Hamilton, Renner & Kenner

[57] ABSTRACT

An apparatus for making fiber reinforced plastic members. The apparatus employs a rotatable mandrel (18) and a winding head (16) with a unique arrangement by which to effect relative longitudinal movement between the winding head (16) and the mandrel (18). Either the winding head (16) or the mandrel (18) may be longitudinally fixed. The other of those members is mounted on a trolley (30) that can be reciprocated parallel to the longitudinal axis (42) of the mandrel (18). This reciprocation is effected by having a dog means (51) mounted on the trolley (30) that is movable between a first and second position. In the first position the dog means (51) engages a lug (50) on a drive means to move the trolley (30) in one direction, and in the second position the dog means (51) engages the lug (50) to move the trolley (30) in the opposite direction. Further means (71, 72) are provided to move the dog means (51) between said first and second positions and to provide an appropriate dwell when the movement of the trolley (30) is reversed, said dwell allowing reinforcing strands (35) to anchor and being timed precisely to index the successive wraps of the reinforcing strands (35) onto the mandrel (18).

12 Claims, 6 Drawing Figures

FILAMENT WINDING APPARATUS FOR MAKING FIBER REINFORCED PLASTIC MEMBERS

TECHNICAL FIELD

The present invention relates generally to apparatus by which goods, such as golf clubs, fishing rods and even utility poles are made from liquid, thermosetting resins incorporating fiber, or fibrous, reinforcement.

One of the principal ways such goods are made is by helically winding a succession of resin inpregnated reinforcing strands about a mandrel. The present invention is more particularly directed to an improved mechanism by which relative longitudinal movement is effected between the winding head—i.e., that component by which the reinforcing strands are directed upon the mandrel—and the mandrel as relative rotative movement is simultaneously effected between those two components.

BACKGROUND ART

According to prior art, techniques widely known and used by the industry, one or more strands, or ribbons, of reinforcing material is wound onto the mandrel, beginning at a first end thereof, in a helical configuration of one hand, and one or more successive strands, or ribbons, is wound, beginning at the second end thereof, onto the mandrel in 3 helical configuration of opposite hand. These steps are thereafter repeated with successive strands being wound adjacent to previous winding of like hand until the mandrel is completely covered, and the desired thickness is achieved. Thereafter, the member is cured.

During the winding operation there is, therefore, relative rotational as well as relative longitudinal movement between the mandrel and the winding head.

It is possible to rotate the winding head while rotating, or not rotating, the mandrel. It is also possible to rotate the mandrel while not rotating the winding head. All variations effect the desired relative rotation between the winding head and the mandrel.

Similarly, the relative longitudinal movement between the winding head and the mandrel can be effected by movement of either, or both, said members.

The concepts with respect to which the present invention is involved are not limited to adoption with any particular means for effecting relative longitudinal and/or rotational movement. As such, and purely for the sake of simplicity, the prior art and the present invention shall both hereafter be explained in terms of the situation where the winding head does not rotate but is moved longitudinally along the mandrel and the mandrel does rotate but does not itself move longitudinally.

As the mandrel is thus rotated, and the winding head is moved longitudinally therealong, the reinforcing strands engage the mandrel in longitudinally spaced relation with respect to the location of the head itself—normally in longitudinally spaced relation rearwardly of the head as the head traverses longitudinally along the mandrel. This lag in the contact of the reinforcing strands with the mandrel causes no problem until the head reverses its direction. When contact between the filaments and the mandrel does lag the location of the winding head, sudden reversal of the direction in which the winding head is moving will cause the tension in the span of the strands between the head and the mandrel to be released. As the tension of the fibers go slack, the position of the fibers about the mandrel will shift, and this adverse affect is particularly emphasized as the movement of the head immediately reciprocates past the location where the strands contact the mandrel while the strands are slackened.

Any shift in the location, and thus the orientation of the strands, creates multiple adverse affects. Not only is the reinforcing effect altered—in fact, the strands may slacken sufficiently to disengage from a portion of the mandrel and destroy the desired configuration of the article being so made—but the shift also prevents the successive layers from being accurately deposited relative to the strands already positioned about the mandrel.

DISCLOSURE OF INVENTION

It is, therefore, an object of the present invention to provide an improvement to apparatus for making fiber reinforced plastic members that wind the reinforcing filaments onto a mandrel.

It is another object of the present invention to provide an improvement, as above, by which the desired location and disposition of the reinforcing filaments, or strands, is accurately maintained along the full working portion of the mandrel even though the winding head by which the filaments are directed onto the mandrel reciprocates longitudinally with respect to the mandrel.

It is a further object of the present invention to provide an improvement, as above, by which the winding head is caused to move longitudinally along the mandrel and dwell at each end thereof for a predetermined time.

It is a still further object of the present invention to provide an improvement, as above, in which the duration of the dwell allows a sufficient time for the reinforcing filaments to anchor before the direction of the winding head is reversed and also to provide the requisite timing accurately to index the relative movement of the winding head with respect to the mandrel such that successive layers may be precisely deposited, as, for example, in adjacent juxaposition.

These and other objects, together with the advantages thereof over the existing prior art forms which will become apparent from the following specification, are accomplished by means hereinafter described and claimed.

In general, an apparatus for making fiber reinforced plastic members has a mandrel and a winding head that are relatively movable both longitudinally and rotatably. The present invention is directed to the improved means by which the relative longitudinal movement is effected.

A trolley is carried on the apparatus and is movable in a direction parallel to the longitudinal axis of the mandrel. Although either the mandrel or the winding head may be supported on the trolley, in the embodiment depicted the winding head is mounted on the trolley to be moved longitudinally with respect to the mandrel.

A drive means is provided, and a lug is presented from the drive means. The drive means reciprocates the lug through a preselected range.

Dog means are carried on the trolley and are engaged by the lug to move the trolley. Independent means are provided: to release the dog means from the lug when the trolley has been moved in a given direction to a selected location; to provide a dwell in the movement of the trolley; and, at the appropriate time, to permit reengagement of the dog means by said lug whereby to move said trolley in the opposite direction.

One preferred embodiment of an apparatus for making fiber reinforced plastic members and incorporating an improved means by which to effect relative longitudinal movement between the mandrel and the winding head is shown by way of example in the accompanying drawings and is described in detail without attempting to show all of the various forms and modifications in which the invention might be embodied; the invention being measured by the appended claims and not by the details of the specification.

PREFERRED EMBODIMENT FOR CARRYING OUT THE INVENTION

Figure 1:
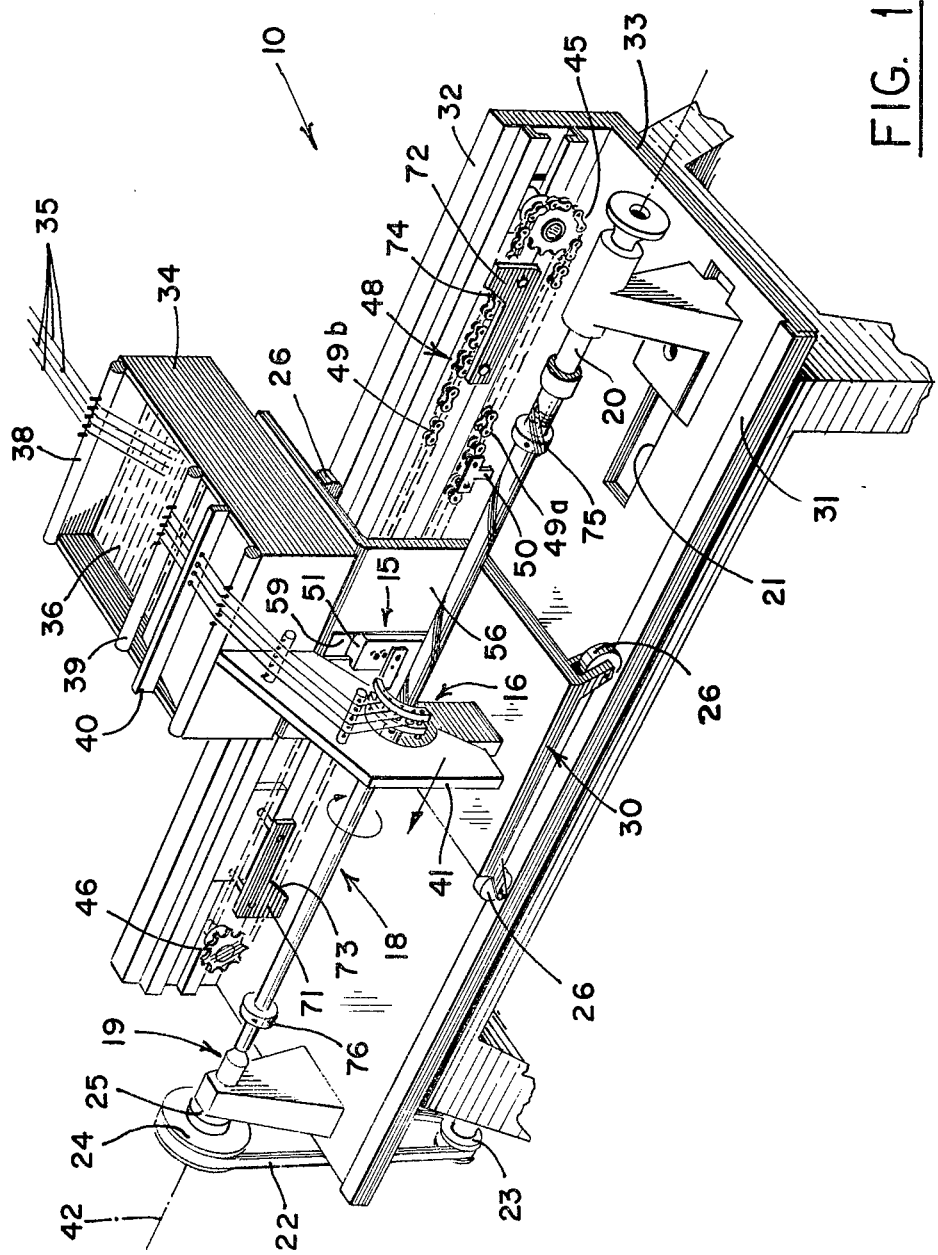
FIG. 1 is a schematic, frontal perspective of an apparatus for making fiber reinforced plastic members, said apparatus incorporating an improved means by which to effect relative longitudinal movement between the mandrel and the winding head.

An apparatus for making fiber reinforced plastic members is depicted in FIG. 1 and designated generally by the numeral 10. The apparatus 10 is depicted schematically in order to obviate unnecessary minutia and yet is depicted in sufficient detail fully to disclose the construction and operation of the improved means 15 by which to effect relative longitudinal movement between the winding head 16 and the mandrel 18.

As can be seen in FIG. 1, the mandrel 18 is rotatably mounted between a live spindle 19 and a dead spindle 20. The dead spindle 20 may be adjustably secured along a way 21 in order to accommodate mandrels of various lengths, and the live spindle 19 is rotated by an operative connection with power source (not shown). As is shown, a belt 22 transmits power from the drive pully 23 to the driven pully 24 secured on the shaft 25 of the live spindle 19.

Wheels 26 presented by the trolley 30 are movable along tracks 31 and 32 on the frame 33 of the apparatus 10. The trolley 30 may carry an immersion tank 34 within which the reinforcing strands 35 are impregnated with the desired resin 36. A plurality of continuous strands of fiber reinforcing such as glass, graphite or other filaments, either natural or synthetic, are singularly and/or collectively designated by the numeral 35.

The particular type of resins selected will be chosen for its characteristic with respect to the specific service conditions it will need to endure. Among those resins generally suitable for fiber reinforced plastic members are the polyesters, the vinylesters and the epoxies. Additional factors which may be considered in selection of the resin are viscosity, gel time, strength, moduli, shrinkage after curing and cost. Ingredients such as pigments, catalysts and fillers are common additives to a resin mixture, and the term resin as used hereinafter is intended to include any mixture of ingredients generally suitable for fiber reinforced plastic members. The foregoing resins are generally cured by heat, and the reaction is ordinarily initiated in the range of 250° to 280° F. (121° to 138° C.), but because the reaction is exothermic, the temperature may rise to over 400° F. (204° C.) and it is, therefore, understood that the temperature ranges will vary with respect to the type of resin selected.

In order to achieve the fullest possible impregnation of the resin 36 into the reinforcing strands the strands are fully immersed within the resin reservoir as by passing the strands over a customary separating and aligning comb 38, beneath an immersion bar (not shown) within the reservoir of resin 36 in the tank 34, then upwardly out of the resin bath, over a further comb bar 39, through doctor orifice plate 40, or the like, whereby to control the resin content on the strands and thus, ultimately, the resin content in the laminate member itself.

The winding head 16, which directs the reinforcing strands 35 onto the mandrel 18, is supported on a locator plate 41 which is also carried on the trolley 30 and extends outwardly from the tank 34. The details of a suitable winding head and the geometry of the feed pattern by which the strands 35 are directed from the tank 34 to the winding head 16 are disclosed in detail in my prior U.S. Pat. No. 4,089,727.

Figure 2:
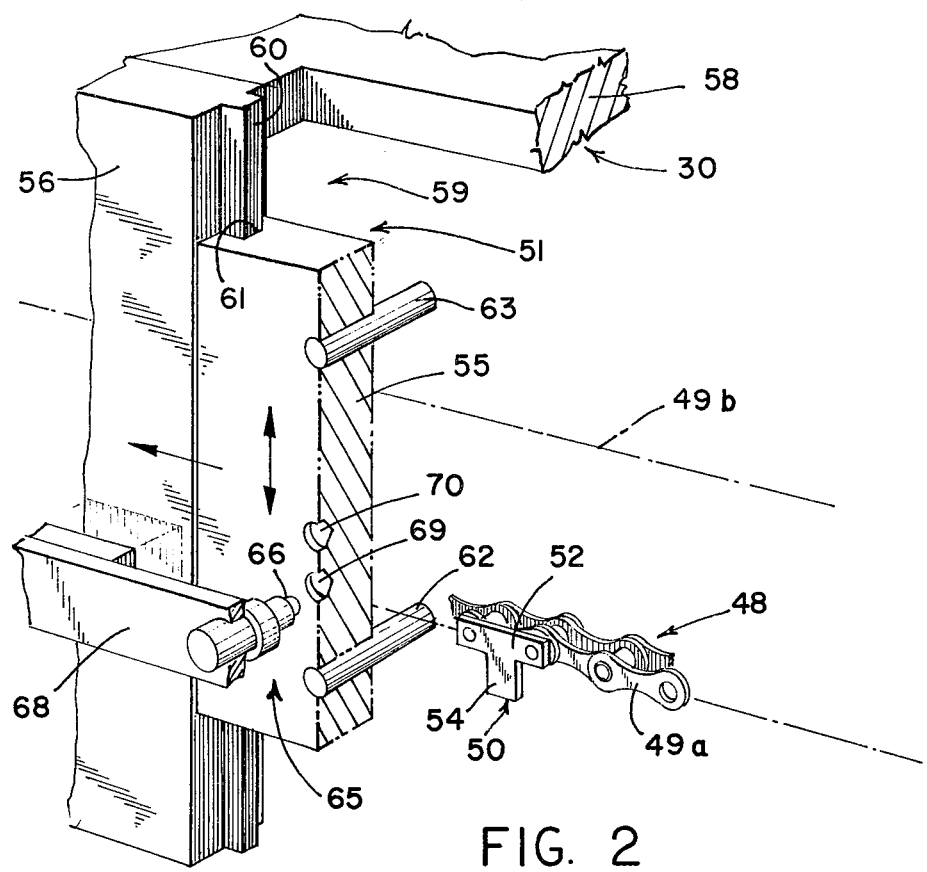
FIG. 2 is an enlarged, exploded perspective view which depicts a portion of the trolley with the dog means slidably mounted thereon and in conjunction with a portion of the drive means, as exemplified by the chain drive from which the lug projects.

The trolley 30 is reciprocated with respect to the longitudinal axis 42 of the mandrel 18 by virture of an improved means 15. As is also shown in FIG. 1, a drive sprocket and a longitudinally spaced idler sprocket 46 are also presented from the frame 33 of the apparatus 10. A continuous chain 48 spans between the spaced sprockets 45 and 46 to present a first, or lower, run 49a and a second, or upper, run 49b. A lug 50 is secured to the chain 48 to engage dog means 51 presented from the trolley 30. As best shown in FIG. 2, the lug 50 may be in generally T-shaped configuration, the cross bar portion 52 serving as a side link of the chain 48, with the stem portion 54 extending perpendicularly outwardly from the cross bar portion 52, and thus also, perpendicularly outwardly from whichever run 49a or 49b along which the lug 50 is being moved by the chain 48.

The dog means 51 employs a block 55 that is slidably mounted on the trolley 30. Specifically, the vertical leg 56 in the frame 58 of the trolley 30—i.e., the leg 56 which is disposed parallel, and in proximity, to the plane within which the runs 49a and 49b are disposed, contains an aperture 59 the opposed lateral sides of which each present a vertical track in the form of a tongue 60. The block 55 is appropriately grooved, as at 61, slidably to be received on the tongues 60 forming the track.

Figure 3:
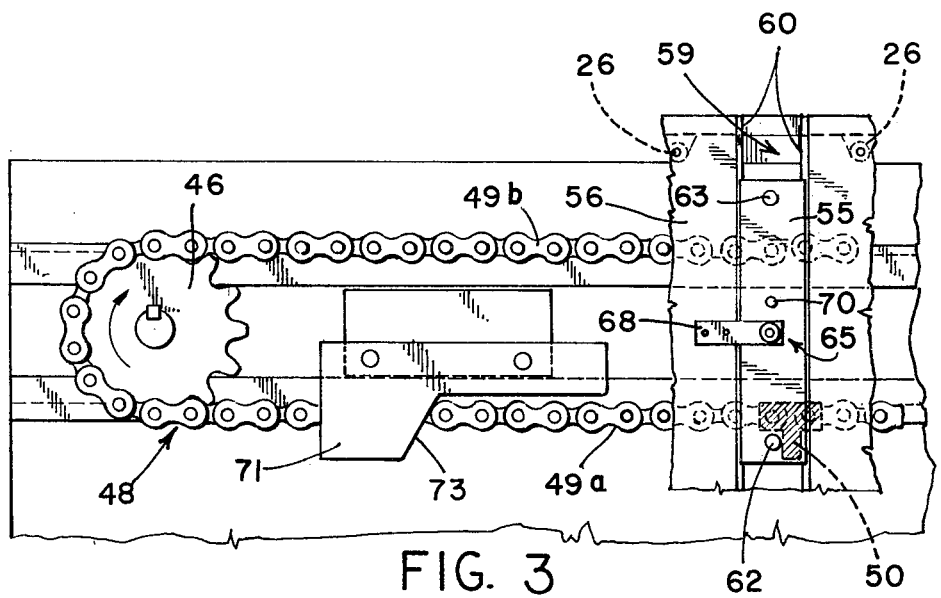
FIG. 3 is a partial frontal elevation which depicts the dog means engaged by the lug on the drive means and moving, in the direction of the arrow, toward the independent means, in the form of a cam plate, by which the dog means is released from the lug.

A pair of engaging pins 62 and 63 are secured to, and extend outwardly from, the slide block 55. As shown in FIG. 3, engaging pin 62 is positionable to extend transversely of the lug 50 and be engageable thereby as the lug 50 is carried along the first run 49a by chain 48. When the engaging pin 62 is so disposed, a detent means 65 releasably retains the slide block in what shall hereinafter be designated as the first position.

The detent means 65 comprises a spring-loaded plunger 66 supported from a bracket 68 carried on the trolley 30 and disposed cooperatively to engage one or more appropriate recesses 69 or 70 in the block 55. When the block 55 is in the first position, the plunger 66 engages recess 69 releasably to retain the block in that position.

Figure 5:
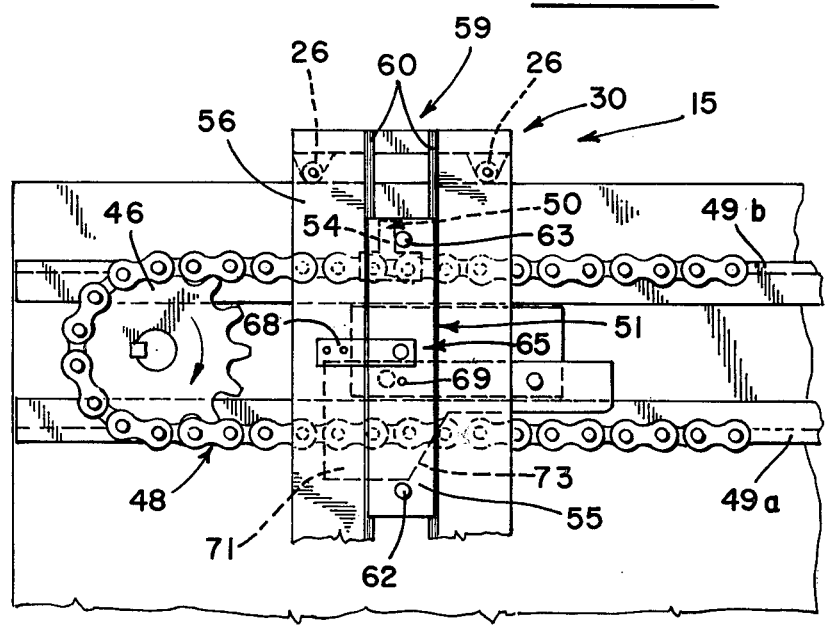
FIG. 5 is a view similar to FIGS. 3 and 4 but depicting the relative disposition of the components in a time frame even later than that to which FIGS. 3 and 4 relate—i.e., in FIG. 5 the lug has moved in a direction opposite to its movements in FIGS. 3 and 4 sufficient to reengage the dog means in the manner required to reverse that movement of the trolley with respect to the movement occasioned when the components are in the disposition depicted in FIG. 3; and, FIG. 6 is an enlarged area of FIG. 1 and depicting the lagging contact of the reinforcing strands with the mandrel vis-a-vis the contact of the reinforcing strands with the winding head.

The block 55 is also slidable to a second position, as represented in FIG. 5. The plunger 66 engages the recess 70 releasably to retain the block 55 in said second position. When the block is in the second position, the engaging pin 63, which also extends transversely of the lug 50, is engageable by the lug 50 as it traverses the second run 49b of the chain 48. As noted, this is represented in FIG. 5 which is hereinafter more fully described.

Means are also provided cooperatively to move the slide block 55 between the said first and second positions. In the preferred embodiment, this means comprises a pair of cam plates 71 and 72 presented from the frame 33 of apparatus 10. The cam plate 71 is mounted with an inclined camming, or throw, surface 73 that is disposed with respect to the first run 49a so as to coact with the engaging pin 62 as it moves along the first run 49a and thereby slide the block 55 from the first to the second position.

The cam plate 72 is presented with an inclined camming, or throw, surface 74 that is disposed with respect to the second run 49b so as to coact with the engaging pin 63 as it moves along the second run 49b and thereby slide the block 55 from the second to the first position.

The location of the cam plates 71 and 72 is carefully selected to provide the necessary dwell whereby to anchor the reinforcing strands as they are wound onto the mandrel. In addition, the dwell period is selected by the location of the cam plates 71 and 72 in conjunction with the rotational velocity of the mandrel and the number of links in the chain 48 which pass over the sprocket wheel 45 or 46 adjacent to the appropriate cam plate during the dwell period accurately to index the location of the successive wraps of reinforcing strands wound onto the mandrel.

Figure 4:
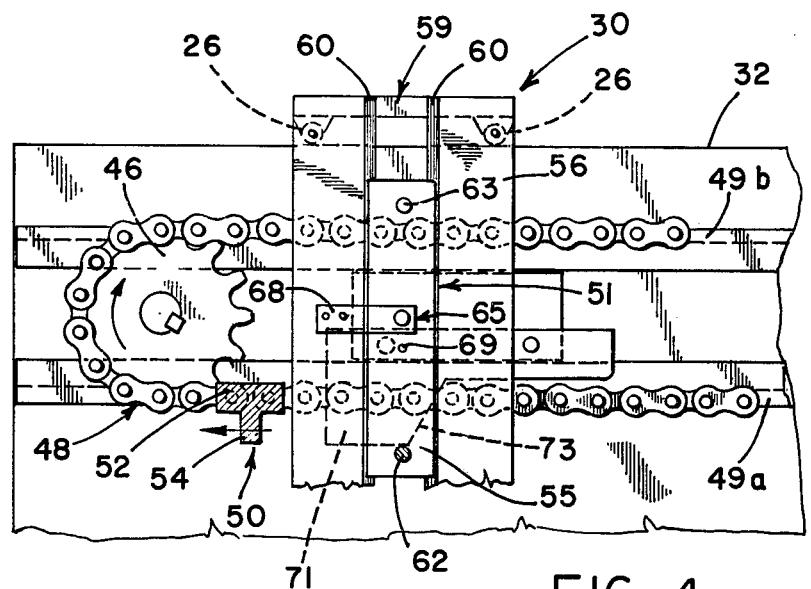
FIG. 4 is a view similar to FIG. 3 but depicting the relative disposition of the components in a time frame sequentially following that to which FIG. 3 relates—i.e., in FIG. 4 the cam plate has caused the dog means to be released from its driving engagement with the lug and the lug has progressed with the drive means independently of the dog means, thereby effecting a dwell for the trolley.

The description that follows, taken in conjunction with reference to the successive staging of the components depicted in FIGS. 3, 4 and 5, will amplify the explanation as to the operation of the apparatus 10.

In FIG. 3 the chain 48 is being driven to rotate the idler sprocket 46 in the direction of the arrow superimposed thereon. As such, run 49a of chain 48 is moving to the left and the lug 50 is driving the engaging pin 62 to translate the trolley 30 commensurate with the speed of the chain as it moves along run 49a. The mandrel 18 is simultaneously being rotated clockwise (as viewed in FIG. 1) so that a ribbon of the reinforcing strands 35 is being wound helically about the mandrel.

Figure 6:
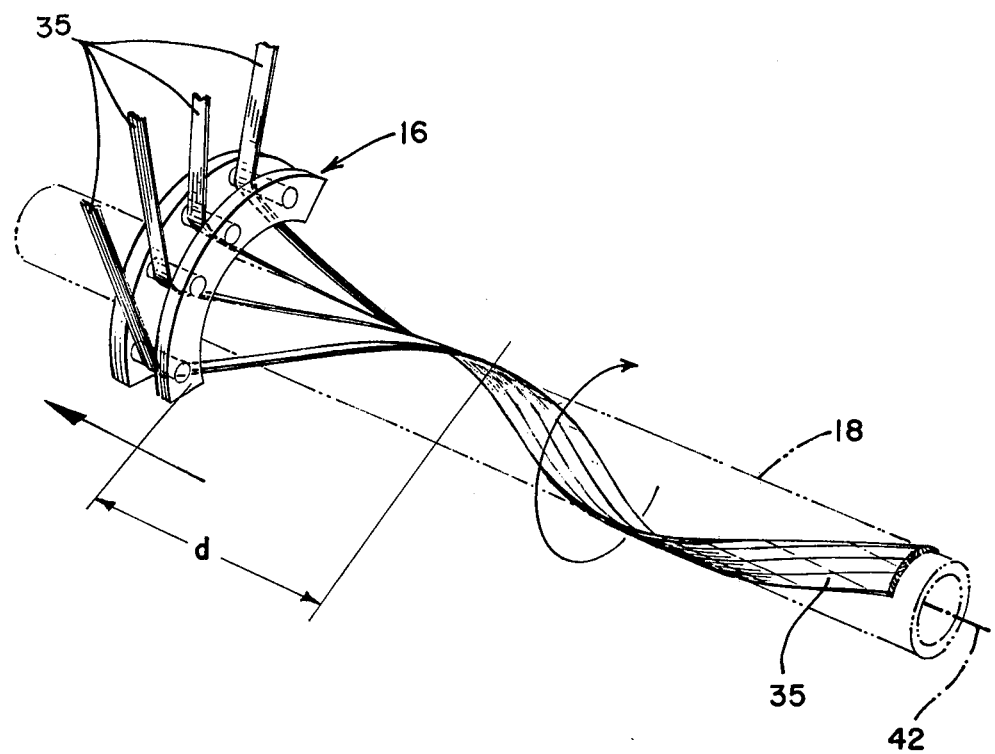

As best seen in FIG. 6, the engagement of the mandrel 18 by the strands of filament 35 being wound thereon lags the location at which the filaments emanate from the winding head 16. That is, the individual strands 35 engage the mandrel 18 at a distance "d" behind the point at which the strands leave the winding head 16. To say that the contact "lags" and/or to say that the contact is made "behind" the winding head implies a relative movement or a time difference. Accordingly, movement of the winding head longitudinally along the mandrel and rotation of the mandrel with respect to the winding head are represented by arrows in FIG. 6 in order to impart the requisite frame of reference to give meaning to "lag" and "behind." This relative disposition of the contact between the strands and the mandrel vis-a-vis the strands on the winding head, remains relative constant as the trolley 30 is translated along the frame 33 of the apparatus 10.

Contact of the engaging pin 62 with the camming surface 73 on cam plate 71 as the engaging pin 62 is being driven by lug 50 moves the slide block 55 from the first to the second position. That is, the slide block is moved from the position depicted in FIG. 3 to the position depicted in FIG. 4. With the block 55 disposed in the second position the lug 50 continues to move with the chain 48 while the trolley 33 is immobilized. During this immobilization, or dwell, of the trolley 30 the mandrel 18 continues to rotate, thereby continuing to wind the strands of filament 35 onto the mandrel 18.

Winding of the strands onto the mandrel during the dwell in the movement of the trolley progressively diminishes the lagging contact of the strands with the mandrel until there is practically no lag and the strands are being wound almost directly beneath—i.e., radially inwardly of, and in the same plane with—the winding head. The resulting overlap in the winding of the strands anchors the preceding helical disposition of the wrap against slippage, and this achorage is further enhanced by the use of some retention means. The retention means may be an annular recess in the outer surface of the mandrel, a plurality of radially directed spokes on which to snub the wrap, or any other suitable configuration. As depicted in FIG. 1, the retention means may comprise a pair of collars 75 and 76 secured to the mandrel 18 and located, one at each end thereof, such that the anchoring wind occurs outboard of the working portion of the mandrel on which the fiber reinforced product is being formed.

As the lug 50 continues to move with chain 48, it will be carried about sprocket 46 to reverse the direction of its movement and begin to traverse run 49b, eventually arriving at the location depicted in FIG. 5 where it will be seen that the lug 50 comes into driving contact with engaging pin 63. Continued movement of the lug 50 along run 49b translates the trolley 30 to the right as depicted in the various figs. and lays a helical wrap of opposite hand onto the mandrel 18. The cam plate 72 in proximity to the drive sprocket 45 slides the block 55 from the second back to the first position, allows the appropriate dwell and locates the engaging pin 62 for movement of the trolley to the left as described in the various figs.

It should, therefore, now be apparent that an apparatus for making fiber reinforced plastic members which employs a means to effect relative longitudinal movement of the winding head with respect to the mandrel embodying the concept of the present invention provides the dwell required when the relative longitudinal movement is reversed to anchor the reinforcing strands, to index the successive wraps and otherwise to accomplish the objects of the invention.

I claim:

1. In an apparatus for making fiber reinforced plastic members, said apparatus having two relatively movable winding elements, one element being a mandrel and the other element being a winding head, means to effect relative rotational movement between said winding elements and means to effect relative longitudinal movement between said winding elements, said apparatus having a frame, one winding element supported on said frame, a trolley mounted on said frame for reciprocating movement thereon, the other winding element carried on said trolley, dog means carried on said trolley selectively connected to said drive means and means to release said dog means from said drive means at selected locations to provide a dwell during which said relative rotational movement continues while said relative longitudinal movement is arrested whereby to anchor the reinforcing strands as they are wound onto the mandrel and subsequently to position said dog means for subsequent reengagement by said drive means.

2. In an apparatus, as set forth in claim 1, a lug secured to said drive means and movable back and forth along a predetermined path.

3. In an apparatus, as set forth in claim 2, said dog means comprising: a block slidably mounted on said trolley and movable between at least two positions, at least one engaging pin presented from said block and extending outwardly thereof to be engaged by said lug.

4. In an apparatus, as set forth in claim 3, said means to release said dog means from said lug at selected locations comprising at least one cam to contact said engaging pin and throw said block between said two positions.

5. In an apparatus for making fiber reinforced plastic members, said apparatus having a mandrel, means to rotate said mandrel and a nonrotating winding head by which to feed reinforcing strands onto said mandrel, a means to effect relative longitudinal movement between said winding head and said mandrel comprising: a trolley carried on said apparatus for movement longitudinally with respect to said mandrel, said winding head supported on said trolley, a drive means supported on said apparatus, a lug carried on said drive means for reciprocating movement longitudinally with respect to said mandrel, at least one dog means carried on said trolley, said dog means being engaged by said lug to move said trolley and means to release said dog means from said lug at selected locations to provide a dwell during which said relative rotational movement continues while said relative longitudinal movement is arrested whereby to anchor the reinforcing strands as they are wound onto the mandrel and subsequently to permit reengagement of said dog means with said lug whereby to reciprocate said trolley.

6. In an apparatus, as set forth in claim 5, said dog means comprising: a block slidably mounted on said trolley and movable between at least two positions, at least one engaging pin presented from said block and extending outwardly thereof to be engaged by said lug.

7. In an apparatus, as set forth in claim 6, said means to release said dog means from said lug at selected locations comprising: at least one cam to contact said engaging pin and throw said block between said two positions.

8. In an apparatus, as set forth in claim 5, said drive comprising: means to move said lug along a pair of substantially parallel, spaced runs.

9. In an apparatus, as set forth in claim 8, said dog means comprising: a block slidably mounted on said trolley and movable between a first and second position, at least one engaging pin presented from said block and extending outwardly thereof to be engaged by said lug.

10. In an apparatus, as set forth in claim 9, said dog means further comprising: a pair of engaging pins presented from said block and extending outwardly thereof and spaced, substantially parallel relation, each engaging pin adapted to be engaged by said lug as it moves along one said run.

11. In an apparatus, as set forth in claim 10, said means to release said dog means from said lug at selected locations comprising: a pair of cams, one cam disposed in association with each said run.

12. In an apparatus, as set forth in claim 11, in which said dog means further comprises: detent means releasably to maintain said block in said first and second positions.

* * * * *